United States Patent [19]
Lucas et al.

[11] Patent Number: 5,489,479
[45] Date of Patent: * Feb. 6, 1996

[54] ROOM TEMPERATURE VULCANIZABLE SILICONE COMPOSITIONS

[75] Inventors: Gary M. Lucas; Jeffrey H. Wengrovius, both of Scotia, N.Y.

[73] Assignee: General Electric Company, Waterford, N.Y.

[*] Notice: The portion of the term of this patent subsequent to May 25, 2010, has been disclaimed.

[21] Appl. No.: 200,840

[22] Filed: Feb. 22, 1994

Related U.S. Application Data

[63] Continuation of Ser. No. 46,511, Apr. 12, 1993, abandoned, which is a continuation of Ser. No. 628,771, Dec. 17, 1990, abandoned.

[51] Int. Cl.$^6$ ..................................................... B32B 27/36
[52] U.S. Cl. .......................... 428/412; 428/421; 428/429; 428/447; 428/450; 428/451; 528/18; 524/730
[58] Field of Search ...................................... 428/447, 412, 428/421, 429, 450, 451; 528/18; 524/730

[56] References Cited

U.S. PATENT DOCUMENTS

| | | | |
|---|---|---|---|
| 4,395,526 | 7/1983 | White et al. | 528/18 |
| 4,417,042 | 11/1983 | Dziark | 528/18 |
| 4,467,063 | 8/1984 | Lockhart | 524/106 |
| 4,472,551 | 9/1984 | White et al. | 524/728 |
| 4,477,625 | 10/1984 | Lockhart | 524/789 |
| 4,483,973 | 11/1984 | Lucas et al. | 528/21 |
| 4,499,229 | 2/1985 | Lockhart | 524/450 |
| 4,499,230 | 2/1985 | Lockhart | 524/450 |
| 4,515,932 | 5/1985 | Chung | 528/16 |
| 4,528,353 | 7/1985 | Lucas et al. | 528/21 |
| 4,863,992 | 9/1989 | Wengrovius et al. | 528/18 |
| 4,895,918 | 1/1990 | Lucas | 528/18 |
| 5,213,899 | 5/1993 | Lucas | 528/18 |

*Primary Examiner*—Melvyn I. Marquis

[57] ABSTRACT

Room temperature vulcanizable silicone compositions are provided having improved shelf life, primerless adhesion, deep section cure, and low toxicity properties, comprising by weight:

A. 100 parts of a polydiorganosiloxane having a viscosity of from about 100 to about 1,000,000 centipoise at 25° C., wherein the silicon atoms at each polymer end chain is terminated with at least two alkoxy radicals, the organic group being a $C_{1-15}$ monovalent hydrocarbon radical;

B. an effective amount of a diorganotin bis beta-diketonate condensation catalyst;

C. from about 0.1 to about 1.5 parts of a scavenger for hydroxy functional groups, preferably a disilazane or polysilazane;

D. from about 0.6 to about 5 parts of an adhesion promoting polyalkoxysilane functionalized with ether, epoxy, isocyanato, cyano, acryloxy, and acyloxy, preferably with epoxy; and E. from 0 to about 10 parts of a crosslinking polyalkoxysilane.

33 Claims, No Drawings

ROOM TEMPERATURE VULCANIZABLE SILICONE COMPOSITIONS

This is a continuation of Ser. No. 08/046,511 filed on Apr. 12, 1993 now abandoned which is a contuation of Ser. No. 07/628,771 filed on Dec. 17, 1990 also abandoned.

BACKGROUND OF THE INVENTION

The present invention relates to room temperature vulcanizable silicone compositions. More particularly, the present invention relates to one component room temperature vulcanizable silicone compositions having improved shelf stability, improved primerless adhesion, improved thick section cure, and low toxicity characteristics.

Polyalkoxy silanes functionalized with ether, epoxy, isocyanato, cyano, acryloxy, or acyloxy are important silane coupling agents for room temperature vulcanizable (RTV) silicone compositions. These compounds impart excellent primerless adhesion to a wide variety of substrates and do not promote sealant yellowing or modulus build. Thus, their use represents a significant improvement over that of aminofunctional alkoxy silanes which do promote sealant yellowing and modulus build.

The use of adhesion-promoting polyalkoxysilanes functionalized with amino, ether, epoxy, isocyanato, cyano, acryloxy, or acyloxy in alkoxy-terminated polydiorganosiloxane RTV compositions is disclosed, for example, in U.S. Pat. Nos. 4,483,973 and 4,528,353 (both to Lucas et al.). The RTV compositions disclosed in these references contain a dialkyltin dicarboxylate as the condensation cure catalyst.

To provide an RTV composition with optimum palmerless adhesion characteristics, an adhesion-promoting polyalkoxy silane functionalized with one of the groups described above must be present in the composition at a level of at least 0.6 parts per 100 parts of the polyalkoxy-terminated polydiorganosiloxane and, preferably, at a level in the range of from about 1.0 to about 1.6 parts. It has been found, however, that in the presence of a dialkyltin dicarboxylate condensation catalyst, an RTV composition containing the adhesion-promoting polyalkoxysilane at levels of 0.8–1.6 parts per 100 parts of the polyalkoxy-terminated polydiorganosiloxane will have poor shelf-stability, even in the presence of high levels of a disilazane hydroxy scavenger. The term "shelf stability" as used herein refers to the quality of cure after aging of the uncured RTV composition for 24 hours at 100° C. The ASTM sheet physical properties of a "shelf stable" RTV sealant composition are essentially unchanged after storage for 24 hours at 100° C. relative to a room temperature stored sealant.

Dialkyltin dicarboxylates, in the presence of free hydroxy species (e.g., ring-opened epoxysilanes), will cause the polyalkoxy-terminated polymer to degrade. As a result, the RTV composition either will not cure or will cure poorly. In order for a dialkyltin dicarboxylate-catalyzed RTV silicone composition containing an epoxy-functional polyalkoxysilane to be shelf-stable, the epoxy-functional polyalkoxysilane must be present at less than 0.45 parts per 100 parts of the polyalkoxy-terminated polydiorganosiloxane. However, this amount is insufficient to achieve optimum primerless adhesion.

It is desirable, therefore, to provide an RTV silicone composition having both prolonged shelf life and excellent primerless adhesion.

The RTV silicone compositions disclosed in the patents to Lucas et al. (Lucas), cited above, contain greater than 2% by weight of silazane hydroxy scavengers. Consequently, in addition to limitations regarding shelf-life and primerless adhesion, the Lucas RTV compositions have inferior deep section cure compared to RTV compositions which do not contain a silazane hydroxy scavenger. The inferior deep section cure of the Lucas compositions is caused by a reduction in polymer crosslink sites resulting from hydrolysis interactions between polymer endgroups and the internal $(CH_3)_3SiO_{1/2}$ group-producing silazane scavengers.

It is therefore further desirable to provide an RTV composition having improved deep section cure.

U.S. Pat. No. 4,517,337 to Lockhart et al. (Lockhart) and U.S. Pat. No. 4,863,992 to Wengrovius et al. (Wengrovius) disclose alkoxy-terminated polydiorganosiloxane RTV silicone compositions containing dialkyltin-bis-diketonate as the cure catalyst. The Wengrovius patent further teaches the use of high levels of an adhesion promoter, which include amino-functional polyalkoxysilanes. The Lockhart and Wengrovius compositions combine superior shelf stability with excellent deep section cure without the use of a silazane scavenger. However, these compositions require a stabilizing amount of excess beta-diketone to prevent methanol/chelate ligand exchange on the tin which would lead to the formation of methoxy-tin equilibration catalysts. For reasons of cost and availability, the beta-diketone of particular commercial interest is 2,4-pentanedione, with the corresponding cure catalyst being dibutyltin-bis-acetylacetonate. However, the Environmental Protection Agency has recently issued a Significant New Use Rule (SNUR) which labels 2,4-pentanedione a potential neurotoxin and mutagen which is developmentally toxic by inhalation. The SNUR essentially prohibits the use of 2,4-pentanedione in any new consumer product, thus greatly restricting the marketability of RTV compositions containing it. Although other, relatively nontoxic beta-diketones, e.g., 2,4-hexanedione, can be used in place of 2,4-pentanedione, such beta-diketones are not commercially available.

Therefore, it is desirable to provide a more readily available substitute compound for 2,4-pentanedione which prevents tin-methoxy species formation and imparts shelf stability to the RTV silicone composition.

It has been found that amino-functional polyalkoxysilanes react with dialkyltin-bis-diketonate catalysts to form free 2,4-pentanedione which, along with its toxicity as discussed above, also has the disadvantage of reacting with iron contaminants in the uncured elastomer composition to produce a yellow color body. In addition, the amino-functional polyalkoxysilanes also promote post-cure instability resulting in modulus build in the cured elastomer composition.

It is further desirable to provide an RTV composition which does not use an amino-functional polyalkoxysilane as an adhesion promoter.

SUMMARY OF THE INVENTION

Accordingly, it is a primary object of the present invention to provide an RTV silicone composition combining prolonged shelf stability, improved primerless adhesion, improved deep section cure, and low toxicity.

It is another object of the present invention to provide an RTV silicone composition containing a substance other than 2,4-pentanedione to prevent tin-methoxy species formation.

These and other objects are achieved in the present invention.

The RTV silicone compositions of the present invention have several advantages including, for example, non-yellowing in either the cured or uncured state; lower, stable modulus; improved deep section cure due to a 75% reduction in scavenger concentration; improved primerless adhesion to substrates; and improved adhesive hydrolytic stability.

The RTV silicone composition of the present invention can tolerate higher levels of an adhesion promoting polyalkoxysilane functionalized with ether, epoxy, isocyanato, cyano, acryloxy, or acyloxy so as to attain improved primerless adhesion without sacrificing shelf stability because the RTV composition contains a dialkyltin-bis-diketonate rather than a dialkyltin dicarboxylate as the condensation catalyst, in combination with trace levels of a scavenger for hydroxy groups. The excellent primerless adhesion is due to the use of the adhesion promoter at amounts of at least 0.6 parts per 100 parts of the polyalkoxy-terminated polydiorganosiloxane. In addition, because the composition of this invention has reduced levels of scavenger, its deep section cure is improved as compared to that of RTV compositions containing higher levels of scavenger. Furthermore, the composition of this invention has lower toxicity because it uses a scavenger instead of 2,4-pentanedione.

The present invention provides scavenger-containing room temperature vulcanizable silicone compositions having improved shelf stability, improved primerless adhesion, improved deep section cure, and lower toxicity, comprising by weight:

A. 100 parts of a polydiorganosiloxane having a viscosity of from about 100 to about 1,000,000 centipoise at 25° C., wherein the silicon atoms at each polymer end chain is terminated with at least two alkoxy radicals, the organic group being a $C_{1-15}$ monovalent hydrocarbon radical;

B. an effective amount of a diorganotin his beta-diketonate condensation catalyst of the general formula:

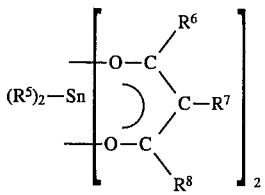

wherein $R^5$ is selected from $C_{(1-18)}$ monovalent hydrocarbon radicals and substituted monovalent hydrocarbon radicals, and $R^6$, $R^7$, and $R^8$ are the same or different monovalent radicals selected from the class consisting of hydrogen, $R^5$, $OR^5$, $-OSi(R^5)_3$, $-Si(R^5)_3$, aryl, acyl, and nitrile;

C. from about 0.1 to about 1.5 parts of a scavenger for hydroxy functional groups;

D. from about 0.6 to about 5 parts of an adhesion promoting polyalkoxysilane having the general formula:

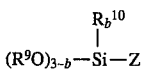

wherein $R^9$ and $R^{10}$ are $C_{1-8}$ monovalent hydrocarbon radicals; Z is a saturated, unsaturated or aromatic hydrocarbon residue which may be further functionalized by a member selected from the class consisting of ether, epoxy, isocyanato, cyano, acryloxy, and acyloxy; and b varies from 0 to 3; and E. from 0 to about 10 parts of a crosslinking polyalkoxysilane.

DETAILED DESCRIPTION OF THE INVENTION

Component (A) of the composition of the present invention is a polydiorganosiloxane polymer terminated at each end of the polymer chain by at least two alkoxy radicals and having a viscosity varying from about 100 to about 1,000,000 centipoise at 25° C. and preferably from about 5000 to about 200,000 centipoise at 25° C. The organic group of the polymer is a $C_{1-15}$ monovalent hydrocarbon radical.

Preferably, the polymer constituting component (A) has the general formula:

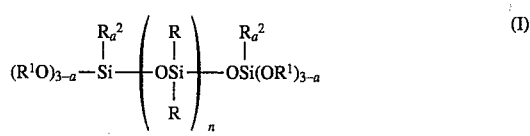

wherein each R and $R^2$ is independently a substituted or unsubstituted $C_{(1-15)}$ monovalent hydrocarbon radical, $R^1$ is a $C_{(1-8)}$ aliphatic organic radical selected from alkyl radicals, alkylether radicals, alkylester radicals, alkylketone radicals, alkylcyano radicals, or a $C_{(7-15)}$ aralkyl radical; n is a whole number ranging from about 50 to about 2500, and "a" is a whole number which is either 0 or 1.

In formula (I), R is preferably selected from $C_{(1-13)}$ monovalent hydrocarbon radicals, halogenated hydrocarbon radicals, and cyano alkyl radicals; $R^1$ is preferably a $C_{(1-8)}$ alkyl radical or a $C_{(7-13)}$ aralkyl radical; and $R^2$ is preferably methyl, phenyl, or vinyl. Most preferably, R, $R^1$, and $R^2$ are each methyl.

The terminal silicon atom in the polymer of component (A) must have at least two alkoxy groups and can have as many as three alkoxy groups in accordance with the above description.

The polymer of formula (I) is preferably produced according to the method described in U.S. Pat. No. 4,515,932 to Chung and U.S. Pat. No. 4,863,992 to Wengrovius et al., which are both hereby incorporated by reference herein. In the Chung and Wengrovius method, the polymer is prepared by reacting a silanol terminated diorganopolysiloxane polymer having a viscosity in the range of 100 to 1,000,000 centipoise at 25° C. where the organic group is a monovalent hydrocarbon group with a polyalkoxy cross-linking agent of the formula

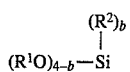

in the presence of an end-coupling catalyst where $R^1$, $R^2$ and b are as previously defined.

The end-coupling reaction whereby the polymer of formula (I) is formed is carried out by mixing the alkoxy silane with the silanol terminated diorganopolysiloxane polymer or polymers in the presence of an end-coupling catalyst selected from the class consisting of Bronsted acids, Lewis acids, stearic acid treated calcium carbonate, and amines and mixtures thereof. The most preferred catalyst is a combination of one of the acids indicated above and an amine.

Component (B) is a diorganotin-bis-diketonate condensation catalyst of the general formula:

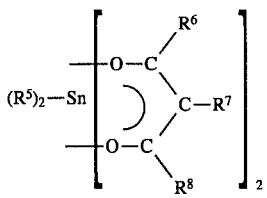

(II)

wherein $R^5$ is selected from $C_{(1-18)}$ monovalent hydrocarbon radicals and substituted monovalent hydrocarbon radicals, and $R^6$, $R^7$, and $R^8$ are the same or different monovalent radicals selected from the class consisting of hydrogen, $OR^5$, $R^5$, $OSi(R^5)_3$, $—Si(R^5)_3$, aryl, acyl, and nitrile.

Radicals included within $R^5$ of formula (11) are, for example, $C_{(6-13)}$ aryl radicals and halogenated aryl radicals, such as phenyl, tolyl, chlorophenyl, naphthyl; $C_{(1-18)}$ aliphatic, cycloaliphatic radicals, and halogenated derivatives thereof, for example, cyclohexyl, cyclobutyl; alkyl and alkenyl radicals, such as methyl, ethyl, propyl, chloropropyl, butyl, pentyl, hexyl, heptyl, octyl, vinyl, allyl, and trifluoropropyl.

Some of the tin condensation catalysts included within formula (11) are, for example:

Di(n-butyl)tinbis(acetylacetonate);
Di(n-butyl)tinbis(benzoylacetonate):
Di(ethyl)tinbis(lauroylacetonate);
Di(methyl)tinbis(pivaloylacetonate);
Di(n-butyl)tinbis(ethylacetoacetate);
Di(n-octyl)tinbis(acetylacetonate); and
Di(n-propyl)tinbis(1,1,1-trifluoroacetylacetonate);
Di(n-butyl)tin(acetylacetonate)(ethylacetoacetate).

The preferred tin catalyst for use in the present invention is di(n-butyl)tinbis(acetylacetonate).

The catalyst is present in an effective amount, which is typically an amount within the range of from about 0.01 to about 2, preferably about 0.1 to about 1, and most preferably from about 0.2 to about 0.5, parts by weight.

Component (C) is a scavenger compound for hydroxy-functional groups.

The scavenger can be any scavenger that is known in the art. A scavenger in this application is defined as any compound having a functional group that will tie up and react with free hydroxy groups in the composition and bond with the hydroxy groups and prevent them from reacting with alkoxy groups in the composition. In this respect, the scavenger can be an integrated crosslinker, scavenger as will be explained below which contains alkoxy groups as well as scavenging groups.

Suitable scavenger compounds for use in the RTV compositions of the present invention are disclosed, for example, in U.S. Pat. No. 4,895,918 (Lucas); U.S. Pat. No. 4,417,042 (Dziark); U.S. Pat. No. 4,467,063 (Lockhart); U.S. Pat. No. 4,477,625 (Lockhart); U.S. Pat. No. 4,499,229 (Lockhart); U.S. Pat. No. 4,499,230 (Lockhart); U.S. Pat. No. 4,395,526 (White et al.); and U.S. Pat. No. 4,472,551 (White et al.), all of which are incorporated by reference herein.

Suitable scavengers for use in this invention include, for example, non-cyclic silanol scavengers and cyclic silyl nitrogen scavengers, which are disclosed in U.S. Pat. No. 4,895,918 to Lucas, which was above incorporated by reference herein.

Another class of scavenging compounds that can be used as scavengers in the RTV compositions of this invention is a silane having the formula

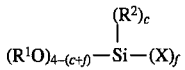

(III)

wherein $R^1$ and $R^2$ are as defined previously herein, and X is a hydrolyzable leaving group selected from the group consisting of silazy, cyclic amido, amido, amino, carbamato, enoxy, imidato, isocyanato, oximato, thioisocyanato, and ureido radicals, "c" is a whole number equal to 0 to 3 inclusive, "f" is an integer equal to 1 to 4 inclusive and the sum of c+f is equal to 1 to 4 inclusive.

Scavengers within the scope of formula (111) are disclosed, for example, in U.S. Pat. No. 4,895,918 to Lucas and U.S. Pat. No. 4,395,526 to White et al., which were both previously incorporated by reference herein.

Also suitable for use in the present invention are the N-silyl-substituted imidazoles disclosed in U.S. Pat. No. 4,467,063 (Lockhart); the zeolites disclosed in U.S. Pat. No. 4,499,230 (Lockhart); and the organic scavengers taught in U.S. Pat. No. 4,472,551 (White et al), which were all previously incorporated by reference herein.

Other suitable scavengers include, for example, the silicon-containing scavengers disclosed in U.S. Pat. Nos. 4,499,229 and 4,477,625, both to Lockhart, which were both previously incorporated by reference herein.

These silicon-containing scavengers have the general formula

wherein X is as previously defined, d is a whole number equal to 0 to 4 inclusive, and the remaining valences of Si other than those which can be satisfied by X can be satisfied by atoms selected from Si, H, C, O, N, P, S, transition elements IIIa, IVa, Va, VIa, VIIa, and VIII and mixtures thereof.

The preferred scavenger for use in the RTV compositions of this invention is a silicon-nitrogen compound selected from the class consisting of:

(a) a silicone-nitrogen compound having the formula

(IV)

where Y is selected from $R^8$ and $(R^7)_2N—$; and (b) A silicon-nitrogen polymer comprising (1) from 3 to 100 mole percent chemically combined structural units selected from the class consisting of units having the formulae

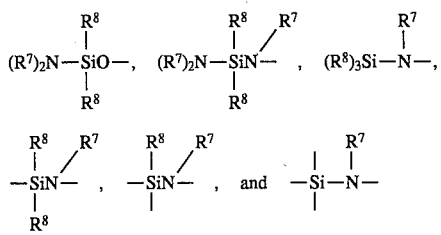

and (2) from 0 to 97 mole percent chemically combined structural units represented by the formula

where the silicon atoms of the silicon-nitrogen polymer are joined to each other by a member selected from a SiOSi linkage and a $SiNR^7Si$ linkage, the free valences of the silicon atoms other than those joined to oxygen to form a siloxy unit and nitrogen to form a silazy unit are joined to a member selected from an $R^8$ radical and an $(R^7)_2N$ radical, and where the ratio of the sum of the $R^8$ radicals and the $(R^7)_2N$ radicals to the silicon atoms of the silicon-nitrogen polymer has a value of 1.5 to 3, inclusive, and $R^7$ is a member selected from the group consisting of hydrogen, monovalent hydrocarbon radicals, and fluoroalkyl radicals, $R^8$ is a member selected from the group consisting of hydrogen, monovalent hydrocarbon radicals, and fluoroalkyl radicals, and c is a whole number equal to 0 to 3, inclusive.

Examples of silicon-nitrogen compounds within the formulae above and suitable for use in the present invention are disclosed in U.S. Pat. No. 4,417,042 (Dziark), which was previously incorporated by reference herein. These compounds include the silazanes and hydrogen-containing amines.

The preferred silicon-nitrogen scavenger compounds for use in this invention are the disilazanes and the polysilazanes. Examples of suitable silazanes include hexamethylcyclotrisilazane, octamethyltetrasilazane, trimethyltriphenylcyciotrisilazane, and trivinyltrimethylcyclotrisilazane, and the like. The most preferred polysilazane for use in this invention is hexamethylcyclo-N-methyltrisilazane and the most preferred disilazane is hexamethyldisilazane.

The scavenger is present in the composition of this invention in an amount within the range of from about 0.1 to about 1.5, preferably about 0.2 to about 1, and most preferably from about 0.4 to about 0.8, parts per 100 parts of the polyalkoxy-terminated polydiorganosiloxane (A).

Component (D) is an adhesion promoter having the general formula:

$$(R^9O)_{3-b}-\underset{\underset{R^{10}_b}{|}}{Si}-Z \quad (V)$$

wherein $R^9$ and $R^{10}$ are $C_{1-8}$ monovalent hydrocarbon radicals, Z is a saturated, unsaturated or aromatic hydrocarbon residue which may be further functionalized by a member selected from the class consisting of ether, epoxy, isocyanato, cyano, acryloxy, and acyloxy; and b varies from 0 to 3.

Preferably, component (D) is an adhesion promoter having the general formula:

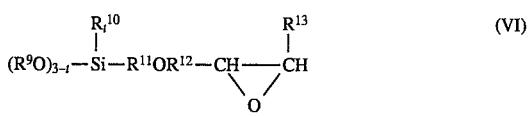

$$(R^9O)_{3-t}-\underset{\underset{R^{10}_t}{|}}{Si}-R^{11}OR^{12}-\underset{\underset{R^{13}}{|}}{CH}-\underset{O}{\overset{}{CH}} \quad (VI)$$

wherein $R^9$ and $R^{10}$ are $C_{1-8}$ monovalent hydrocarbon radicals, $R^{11}$ and $R^{12}$ are $C_{2-12}$ divalent hydrocarbon radicals, $R^{13}$ is selected from the group consisting of hydrogen and $C_{1-8}$ monovalent hydrocarbon radicals and t varies from 0 to 3.

Suitable adhesion promoters within the scope of formulas (V) and (VI) and methods for making them are disclosed in U.S. Pat. No. 4,483,973 (Lucas et al.), hereby incorporated by reference herein.

In formulas (V), $R^{11}$ and $R^{12}$ can be any divalent hydrocarbon radical such as alkylene, arylene, alkylenearylene radicals, and can be substituted or unsubstituted with various groups such as halogen groups, ether groups, ester groups, and other hydrocarbon groups. $R^{13}$ can be hydrogen or a monovalent hydrocarbon radical and is preferably hydrogen. Compounds within the scope of formula (VI) above include, for example, gamma-glycidoxypropylmethyldimethoxysilane, gamma-glycidoxypropyltriethoxysilane, gammaglycidoxypropylmethyldiethoxysilane, and gamma-glycidoxyethyltrimethoxysilane, and epoxycyclohexylethyltrimethoxysilane, and epoxycyclohexylethyltrimethoxysilane. The most preferred compound within the scope of formula (VI) is gamma-glycidoxypropyltdmethoxysilane.

Compounds of formulas (V) and (VI) can be made by silicone producers as described in the literature or obtained from specialty chemical supply houses.

As mentioned previously herein, amino-functional polyalkoxysilanes are not suitable adhesion promoters for use in the compositions of the present invention. These compounds react with the dialkyltin-bis-diketonate catalyst to form free 2,4-pentanedione which, along with its toxicity as discussed previously herein, also has the disadvantage of reacting with iron contaminants in the uncured elastomer composition to produce a yellow color body. In addition, the amino-functional polyalkoxysilanes also promote post-cure instability resulting in modulus build in the cured elastomer composition.

In one method for producing such compounds, an allyl glycidyl ether is reacted with trimethoxyhydridesilane in the presence of a platinum catalyst. This general reaction can be followed to produce other compounds coming within the scope of formula (V) above.

The adhesion promoter is present in the composition of this invention in an amount of from about 0.6 to about 5 parts, preferably from about 0.8 to about 1.6 parts, and most preferably from about 1.0 to about 1.6 parts, per 100 parts of the polyalkoxy-terminated polydiorganosiloxane (A). If the adhesion promoter is present at less than 0.6 parts, improved primerless adhesion will not be achieved.

A crosslinking polyalkoxysilane (E) suitable for use in this invention has the general formula:

$$(R^1O)_{4-b}-\underset{\underset{(R^2)_b}{|}}{Si} \quad (VII)$$

wherein $R^1$, $R^2$, and b are as defined previously herein.

Illustrative compounds represented by formula (VII) above include methyltrimethoxysilane, methyltriethoxysilane, ethyltrimethoxysilane, tetraethoxysilane, and vinyltrimethoxysilane. Methyltrimethoxysilane is preferred.

The crosslinking agent is typically present in the RTV composition of the present invention in an amount ranging from about 0 to about 10, preferably from about 0.3 to about 2, and most preferably from about 0.5 to about 1.6, parts per 100 parts of the polyalkoxy-terminated polydiorganosiloxane.

In preferred embodiments, the RTV composition of this invention further contains (F) a filler. Various fillers can be incorporated into the composition of the present invention such as, for example, titanium dioxide, zirconium silicate, silica aerogel, iron oxide, diatomaceous earth, fumed silica, carbon black, precipitated silica, glass fibers, polyvinyl chloride, ground quartz, calcium carbonate, and the like. The preferred filler for use in the composition of this invention is a reinforcing filler and most preferably fumed silica filler.

The amount of filler used can vary within wide limits in accordance with the intended use.

The compositions of the present invention can be used as construction sealants and caulking compounds. The exact amount of filler, therefore, will depend upon such factors as the application for which the composition is intended and the type of filler used. In general, from about 0 to about 100 parts of filler, which preferably includes up to about 20 parts of fumed silica filler, per 100 parts of the polyalkoxy-terminated polydiorganosiloxane is used in the RTV composition of the present invention.

It is frequently advantageous to pretreat a silica filler with an activating agent such as octamethylcyclotetrasiloxane.

The composition of this invention also preferably comprises (G) a cyano-functional polyalkoxy silane having the general formula:

$$(R^{14}O)_{3-b}-Si-Z \quad | \quad R_b^{15} \tag{VIII}$$

wherein each $R^{14}$ and $R^{15}$ is independently a monovalent hydrocarbon or substituted hydrocarbon radicals having from 1 to about 8 carbon atoms, "b" is a number ranging from about 0 to about 3, and Z is a saturated, unsaturated or aromatic cyano-functionalized hydrocarbon radical.

It has been found that the combination of a cyano-functional polyalkoxysilane within the scope of formula (VIII) above with reinforcing filler and an alkoxy-functional polydiorganosiloxane prepared by reacting a silanol terminated diorganopolysiloxane polymer with a polyalkoxysilane cross-linking agent in the presence of an end-coupling catalyst that is a combination of an acid and an amine, as described previously herein, will result in the RTV composition having better extrusion rates and thixotropic properties.

In the compound of formula (VIII), $R^{14}$ and $R^{15}$ can be alkyl radicals, e.g., methyl, ethyl, propyl, and the like; alkenyl radicals, e.g., vinyl, allyl, and the like; cycloalkyl radicals, e.g., cyclohexyl, cycloheptyl, and the like; mononuclear aryl radicals, e.g., methyl-phenyl and the like; and fluoroalkyl radicals, e.g., 3,3,3-trifluoropropyl. Preferably, $R^{14}$ and $R^{15}$ are preferably selected from methyl or ethyl, and most preferably are both methyl.

Z preferably has the formula $$-R^{16}C\equiv N$$

wherein $R^{16}$ is a $C_{(1-12)}$ divalent hydrocarbon radical. $R^{16}$ is preferably an alkylene or arylene substituted divalent hydrocarbon radical of 2 to about 12, and most preferably from about 2 to about 4, carbon atoms.

In formula (VII), "b" is preferably 0 or 1 and most preferably 0.

A preferred specific compound within the scope of formula (VIII) above is beta-cyanoethyltrimethoxysilane. Other specific compounds include
  3-(cyanoethoxy)-3-methylbutenyltrimethoxysilane
  beta-cyanoethyltriethoxysilane
  beta-cyanoethyltrimethoxysilane
  2-cyanoethylmethyldiethoxysilane
  3-cyanopropyltriethoxysilane
  cyanopropylmethyldimethoxysilane
  1-cyanoethyltris(methoxyethoxy)silane.

Methods for preparing the compounds within the scope of formula (VIII) are disclosed, for example, in U.S. Pat. Nos. 4,483,973 and 4,528,353, both to Lucas et al., which are both hereby incorporated by reference herein. These compounds can be prepared by reacting an olefinic cyanide with a trichlorohyddde silane in the presence of a platinum catalyst to produce the desired intermediate and then alkoxylating this intermediate so as to produce the cyano-functional alkoxysilane. Accordingly, one specific type of reaction could be, for instance, allyl cyanide reacted with trichlorosilane. In this reaction, the chlorosilane is reacted with the cyanide, otherwise, since the methoxy group will react with the cyanide group to lower the yield of the desired product if the methoxylated intermediate is used in the addition reaction with the platinum catalyst.

Component (G) can be present in the composition of this invention in an amount ranging from about 0 to about 10, preferably from about 0.3 to about 2, and most preferably from about 0.5 to about 1, parts per 100 parts of the polyalkoxy-terminated polydiorganosiloxane (A).

The composition of the present invention may further contain from about 1 to about 50 parts by weight of a triorganosilyl endstopped diorganopolysiloxane having a viscosity of from 10 to 5000 centipoise at 25° C., where the organo groups are monovalent hydrocarbon radicals, preferably of from 1 to 8 carbon atoms. Such linear diorganopolysiloxane polymers are useful as plasticizers. Preferably, such plasticizers are free of silanol groups but usually there is present up to about 500 ppm of silanol groups. It is also preferable that the organo substituent groups are methyl and that the viscosity range from 10 to 1000 centipoise at 25° C.

In place of, or in addition to, the foregoing plasticizer it is desirable to further include in the room temperature vulcanizable composition of the present invention from 1 to 20 parts by weight of a fluid siloxane containing a high degree of trifunctionality, tetrafunctionality or a mixture of tri- and tetrafunctionality. Generally, such plasticizers compdse (i) from 25 to 60 mole percent of monoalkylsiloxy units, siloxy units, or mixtures thereof, (ii) from 1 to 6 mole percent of trialkylsiloxy units and (iii) from 34 to 74 mole percent of dialkylsiloxy units, and wherein the plasticizer fluid contains from about 0.1 to about 2 percent by weight of silicon bonded hydroxyl units.

Other compounds, for example, flame retardants such as platinum, may also be included in the composition of the present invention.

The RTV compositions of the present invention may be prepared by methods known in the art. For example, they may be prepared by mixing all the ingredients together at the same time. Preferably, they are prepared by rigorously blending a mixture of the polyalkoxy-terminated polymer, the cyano-functional polyalkoxy silane, and filler. Afterwards, the crosslinker, tin catalyst, stabilizer/scavenger, adhesion promoter, and other ingredients, e.g., plasticizer, are added separately or together, followed by thorough mixing under anhydrous conditions.

The RTV compositions may be coated on a variety of substrates, particularly masonry substrates. Examples of suitable substrates include aluminum, glass, polyacrylate, polycarbonate, polyvinylchloride, and concrete.

The Examples given below are provided for the purpose of illustrating the present invention. They are not given for any purpose of setting limits or boundaries to the instant invention. All parts in the Examples are by weight.

EXPERIMENTAL

EXAMPLE 1

Example 1 illustrates the preparation of methyldimethoxy terminated polydimethylsiloxane polymer. This polymer was prepared by mixing the following materials under anhydrous conditions:

| | |
|---|---|
| Hydroxy-terminated polydimethylsiloxane polymer having a viscosity of 110,000 centipoise at 25° C. | 100 parts |
| Methyltrimethoxysilane | 1.75 parts |
| Diisobutylamine | 0.06 parts |
| Formic Acid | 0.03 parts |

The reaction mixture was heated for 3 hours at 120° C. under a nitrogen atmosphere. At this point, the polydimethylsiloxane was found by $Si^{29}$ FTNMR analysis to be 100% endcapped with $CH_3(CH_3O)2Si$-groups. The final endcapped polymer had a viscosity of 130,000 centipoise at 25° C.

EXAMPLE 2

Example 2 describes the continuous preparation of a scavenger/stabilizer-free RTV sealant composition using a 30 mm Werner-Pfleiderer twin screw extruder. This example illustrates the lack of shelf stability that results from the absence of either a disilazane scavenger or excess free beta-diketone stabilizer.

All sections of the extruder were heated to 75° C. Continuously added to barrel 1 of the extruder were 16 parts of D4-treated fumed silica, 60 parts of the methyldimethoxy-terminated polydimethylsiloxane polymer prepared in Example 1 above, and 0.8 parts of cyanoethyltrimethoxysilane. To barrel 8 there was continuously added 40 parts of the polymer prepared in Example 1, 17.5 parts of a trimethylsilyl-terminated polydimethylsiloxane fluid having a viscosity of 100 centipoise, and 17.5 parts of an MDT silanol fluid having a viscosity of 50 centipoise. A de-airing vacuum was applied at barrel 11. To barrel 12 there was continuously added 0.48 parts of dibutyltin-bisacetylacetonate cure catalyst, 0.48 parts of glycidoxypropyltrimethoxysilane, and 1.6 parts of methyltrimethoxysilane. The RTV sealant was continuously produced at a rate of 40 pounds/hour.

The sealant composition was cured for 7 days at 72° C. and 50% relative humidity (standard conditions). The ASTM physical properties of the sealant were then measured. Accelerated shelf age ASTM physical properties were measured after heating the uncured sealant for 24 hours at 100° C. followed by a 7 day cure at standard conditions. A second series of accelerated shelf age ASTM physical properties were measured after heating the uncured sealant for 14 days at 70° C. followed by a 7 day cure at standard conditions. 1"×1"×1/8" PVC lap shear adhesion specimens (a measure of deep section cure) were made after a 3 day cure at standard conditions. All results are shown in Table 1. The term "N/A" in the tables below refers to "non-applicable" and indicates that the property referred to could not be measured because of the failure of the composition to cure.

TABLE 1

| Sealant Property | 25° C. | 24 hours at 100° C. | 14 days at 70° C. |
|---|---|---|---|
| Tack-free time (min) | 20 | No Cure | No Cure |
| Durometer, Shore A | 20 | N/A | N/A |
| Tensile Strength (psi) | 248 | N/A | N/A |
| Elongation (%) | 482 | N/A | N/A |
| Lap Shear (psi) | 103 | N/A | N/A |

EXAMPLE 3

Example 2 was repeated except that dibutyltindiacetate (0.26 parts) was used as the cure catalyst instead of dibutyltin-bis-acetylacetonate. Example 3 illustrates the lack of sealant stability that results if a disilazane scavenger is not present. The results are shown in Table 2 below.

TABLE 2

| Sealant Property | 25° C. | 24 hours at 100° C. | 14 days at 70° C. |
|---|---|---|---|
| Tack-free time (min) | 20 | No Cure | No Cure |
| Durometer, Shore A | 22 | N/A | N/A |
| Tensile Strength (psi) | 250 | N/A | N/A |
| Elongation (%) | 473 | N/A | N/A |
| Lap Shear (psi) | 65 | N/A | N/A |

EXAMPLE 4

Example 3 was repeated except that 0.8 parts of hexamethyldisilazane were continuously added to barrel 1 of the extruder. Example 4 illustrates the lack of shelf stability that results in a dibutyltindiacetate-catalyzed RTV sealant composition when an insufficient amount of disilazane scavenger is present. The results are presented in Table 3.

TABLE 3

| Sealant Property | 25° C. | 24 hours at 100° C. | 14 days at 70° C. |
|---|---|---|---|
| Tack-free time (min) | 20 | No Cure | No Cure |
| Durometer, Shore A | 21 | N/A | N/A |
| Tensile Strength (psi) | 245 | N/A | N/A |
| Elongation (%) | 505 | N/A | N/A |
| Lap Shear (psi) | 73 | N/A | N/A |

EXAMPLE 5

Example 3 was repeated except that 3.2 parts of hexamethyldisilazane were continuously added to barrel 1 of the extruder. Example 5 illustrates that shelf stability is obtained with higher levels of disilazane scavenger but deep section cure quality is compromised. The results are shown in Table 4.

TABLE 4

| Sealant Property | 25° C. | 24 hours at 100° C. | 14 days at 70° C. |
|---|---|---|---|
| Tack-free time (min) | 20 | 20 | 20 |
| Durometer, Shore A | 21 | 20 | 22 |
| Tensile Strength (psi) | 237 | 212 | 252 |
| Elongation (%) | 501 | 555 | 495 |
| Lap Shear (psi) | 35 | No Testing | No Testing |

EXAMPLE 6

Example 5 was repeated except that 0.8 parts of glycidoxypropyltrimethoxysilane were continuously added to barrel 8 of the extruder. Example 6 illustrates that shelf stability of a dibutyltindiacetate-catalyzed RTV sealant composition containing high hexamethyldisilazane levels is lost when the level of glycidoxypropyltrimethoxysilane is increased from 0.48 parts (i.e., about 0.3 weight percent) to 0.8 parts (i.e., about 0.5 weight percent) in the sealant. The results are presented in Table 5.

TABLE 5

| Sealant Property | 25° C. | 24 hours at 100° C. | 14 days at 70° C. |
|---|---|---|---|
| Tack-free time (min) | 20 | No Cure | No Cure |
| Durometer, Shore A | 24 | N/A | N/A |
| Tensile Strength (psi) | 252 | N/A | N/A |
| Elongation (%) | 531 | N/A | N/A |
| Lap Shear (psi) | 27 | N/A | N/A |

EXAMPLE 7

Example 2 was repeated except that 0.8 parts of hexamethyldisilazane were continuously added to barrel 1 of the extruder. Example 7 illustrates that low levels of a disilazane scavenger will stabilize a dibutyltin-bis-acetylacetonate-catalyzed RTV composition in the presence of 0.48 parts (about 0.3 weight percent) glycidoxypropyltrimethoxysilane. In addition, improved deep section cure is shown at low (i.e., 0.8 parts or 0.5 weight percent) hexamethyldisilazane levels. The results are shown in Table 6.

TABLE 6

| Sealant Property | 25° C. | 24 hours at 100° C. | 14 days at 70° C. |
|---|---|---|---|
| Tack-free time (min) | 20 | 30 | 20 |
| Durometer, Shore A | 17 | 15 | 18 |
| Tensile Strength (psi) | 251 | 239 | 247 |
| Elongation (%) | 544 | 587 | 531 |
| Lap Shear (psi) | 105 | No Testing | No Testing |

EXAMPLE 8

Example 2 was repeated except that 0.8 parts of hexamethyldisilazane were continuously added to barrel 1 and 0.8 parts glycidoxypropyltdmethoxysilane were continuously added to barrel 12 of the extruder. Example 8 demonstrates that a dibutyltin-bis-acetylacetonate-catalyzed RTV composition at low levels (i.e., 0.8 parts or 0.5 weight percent) of hexamethyldisilazane is shelf-stable in the presence of high levels (i.e., 0.8 parts or 0.5 weight percent) of glycidoxypropyltrimethoxysilane. The results are shown in Table 7.

TABLE 7

| Sealant Property | 25° C. | 24 hours at 100° C. | 14 days at 70° C. |
|---|---|---|---|
| Tack-free time (min) | 20 | 30 | 20 |
| Durometer, Shore A | 17 | 15 | 17 |
| Tensile Strength (psi) | 252 | 299 | 262 |
| Elongation (%) | 554 | 634 | 572 |
| Lap Shear (psi) | 125 | No Testing | No Testing |

EXAMPLE 9

Example 7 was repeated except that high levels (i.e., about 1 part or 0.7 weight percent) of glycidoxypropyltrimethoxysilane were used. Example 9 illustrates that a dibutyltin-bis-acetylacetonate-catalyzed RTV composition containing low levels of hexamethyldisilazane is shelf-stable in the presence of high levels of glycidoxypropyltrimethoxysilane. The results are shown in Table 8.

TABLE 8

| Sealant Property | 25° C. | 24 hours at 100° C. | 14 days at 70° C. |
|---|---|---|---|
| Tack-free time (min) | 20 | 30 | 20 |
| Durometer, Shore A | 17 | 15 | 15 |
| Tensile Strength (psi) | 216 | 218 | 210 |
| Elongation | 512 | 524 | 535 |
| Lap Shear (psi) | 131 | No Testing | No Testing |

EXAMPLE 10

Example 7 was repeated except that 1.6 parts of glycidoxypropyltrimethoxysilane were continuously added to barrel 12 of the extruder. Example 10 illustrates that a dibutyltin-bis-acetylacetonate-catalyzed RTV composition containing low levels of hexamethyldisilazane is shelf-stable in the presence of high levels of glycidoxypropyltrimethoxysilane. The results are shown in Table 9.

TABLE 9

| Sealant Property | 25° C. | 24 hours at 100° C. | 14 days at 70° C. |
|---|---|---|---|
| Tack-free time (min) | 20 | 30 | 20 |
| Durometer, Shore A | 19 | 15 | 18 |
| Tensile Strength (psi) | 267 | 280 | 269 |
| Elongation (%) | 556 | 586 | 510 |
| Lap Shear (psi) | 115 | No Testing | No Testing |

What is claimed is:

1. A scavenger-containing room temperature vulcanizable silicone composition having improved shelf life, primerless adhesion, deep section cure, and low toxicity properties, comprising by weight:

A. 100 parts of a polydiorganosiloxane having a viscosity of from about 100 to about 1,000,000 centipoise at 25° C., wherein the silicon atoms at each polymer end chain is terminated with at least two R'O groups, the organic group being a $C_{1-15}$ monovalent organic radical, wherein R' is as defined below;

B. an effective amount of a diorganotin bis beta-diketonate condensation catalyst of the general formula:

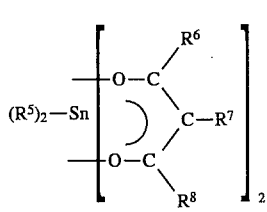

wherein $R^5$ is selected from $C_{(1-18)}$ monovalent hydrocarbon radicals or substituted monovalent hydrocarbon radicals, and $R^6$, $R^7$, and $R^8$ are the same or different monovalent radicals selected from the class consisting of hydrogen, $R^5$, $OR^5$, $-OSi(R^5)_3$, $-Si(R^5)_3$, aryl, acyl, and nitrile;

C. from about 0.1 to about 1.5 parts of a scavenger for hydroxy functional groups;

D. from about 0.6 to about 5 parts of an adhesion promoting polyalkoxysilane having the general formula:

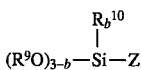

wherein $R^9$ and $R^{10}$ are $C_{1-8}$ monovalent hydrocarbon radicals; Z is a saturated, unsaturated or aromatic hydrocarbon residue which is further functionalized by a member selected from the class consisting of ether, isocyanato, cyano, acryloxy, and acyloxy and a group having the general formula:

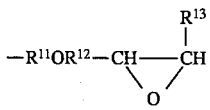

wherein $R^{11}$ and $R^{12}$ are $C_{2-12}$ divalent hydrocarbon radicals, $R^{13}$ is selected from the group consisting of hydrogen and $C_{1-8}$ monovalent hydrocarbon radicals; and b varies from 0 to 1; and E. from 0 to about 10 parts of a crosslinking silane having the general formula:

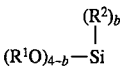

wherein $R^1$ is a $C_{(1-8)}$ aliphatic organic radical selected from alkyl radicals, alkylether radicals, alkylester radicals, alkylketone radicals, alkylcyano radicals, or a $C_{(7-15)}$ aralkyl radical; each $R^2$ is independently a substituted or unsubstituted $C_{(1-15)}$ monovalent hydrocarbon radical; and b is the same as in D wherein component (E) is different from component (D).

2. A room temperature vulcanizable silicone composition according to claim 1 wherein the polyalkoxy-terminated polydiorganosiloxane (A) has the general formula:

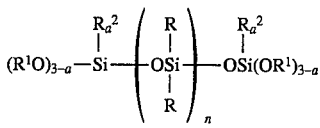

wherein each R and $R^2$ is independently a substituted or unsubstituted $C_{(1-15)}$ monovalent hydrocarbon radical, $R^1$ is a $C_{(1-8)}$ aliphatic organic radical selected from alkyl radicals, alkylether radicals, alkylester radicals, alkylketone radicals, alkylcyano radicals, or a $C_{(7-13)}$ aralkyl radical; "n" is a whole number ranging from about 50 to about 2500, and "a" is a whole number which is either 0 or 1.

3. A composition according to claim 2 wherein R is selected from $C_{(1-13)}$ monovalent hydrocarbon radicals, halogenated hydrocarbon radicals, or cyano alkyl radicals; $R^1$ is a $C_{(1-8)}$ alkyl radical or a $C_{(7-13)}$ aralkyl radical; and $R^2$ is a methyl, phenyl, or vinyl radical.

4. A composition according to claim 3 wherein R, $R^1$, and $R^2$ are each methyl groups.

5. A composition according to claim 1 wherein the tin condensation catalyst is selected from the group consisting of di(n-butyl)tinbis(acetylacetonate), di(n-butyl)tinbis(benzoylacetonate), di(ethyl)tinbis(lauroylacetonate); di(methyl)tinbis(pivaloylacetonate); di(n-octyl)tinbis(acetylacetonate); di(n-propyl)tinbis( 1,1,1 -trifluoroacetylacetonate); di(n-butyl)tin(acetylacetonate)(ethylacetoacetate) and di(n-butyl)tinbis(ethylacetoacetate).

6. A composition according to claim 5 wherein the catalyst is di(n-butyl)tinbis(acetylacetonate).

7. A composition according to claim 1 wherein the adhesion promoting polyalkoxysilane is an epoxy-functional polyalkoxysilane having the general formula:

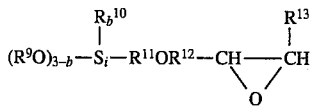

wherein $R^9$, $R^{10}$, $R^{11}$, $R^{12}$, $R^{13}$ and b are as previously defined.

8. A composition according to claim 7 wherein the adhesion promoting epoxy-functional polyalkoxysilane is selected from the group consisting of gamma-glycidoxypropylmethyldimethoxysilane, gamma-glycidoxpropylmethyldiethoxysilane, gamma-glycidoxypropyltriethoxysilane, gamma-glycidoxypropylmethyldiethoxysilane, and gamma-glycidoxyethyltrimethoxysilane, and epoxycyclohexylethyltrimethoxysilane.

9. A composition according to claim 8 wherein the adhesion promoting epoxy-functional polyalkoxysilane is gamma-glycidoxypropyltrimethoxysilane.

10. A composition according to claim 1 wherein the crosslinking polyalkoxy silane is selected from the group consisting of methyltrimethoxysilane, methyltriethoxysilane, ethyltrimethoxysilane, tetraethoxysilane, and vinyltrimethoxysilane.

11. A composition according to claim 10 wherein the crosslinking polyalkoxy silane is methyltrimethoxysilane.

12. A composition according to claim 11 further comprising filler.

13. A composition according to claim 12 wherein the filler is a reinforcing filler.

14. A composition according to claim 13 wherein the filler is fumed silica.

15. A composition according to claim 11 wherein the adhesion promoting polyalkoxysilane (D) is present in an amount ranging from about 0.8 to about 1.6 parts.

16. A composition according to claim 15 wherein the adhesion promoting polyalkoxysilane is present in an amount ranging from about 1.0 to about 1.6 parts.

17. A composition according to claim 11 wherein the condensation catalyst is present in an amount ranging from about 0.01 to about 2.0 parts.

18. A composition according to claim 17 wherein the condensation catalyst is present in the composition in an amount ranging from about 0.1 to about 1.0 parts.

19. A composition according to claim 1 wherein the scavenger is present in the composition in an amount ranging from about 0.2 to about 1 part.

20. A composition according to claim 19 wherein the scavenger is present in the composition in an amount ranging from about 0.4 to about 0.8 part.

21. A composition according to claim 1 wherein the crosslinking polyalkoxysilane is present in an amount ranging from about 0.3 to about 2.0 parts.

22. A composition according to claim 21 wherein the polyalkoxy crosslinking agent is present in an amount ranging from about 0.5 to about 1.6 parts.

23. A scavenger-containing room temperature vulcanizable silicone composition having improved shelf life, primerless adhesion, deep section cure, and low toxicity properties, comprising by weight:

A. 100 parts of a polydiorganosiloxane having a viscosity of from about 100 to about 1,000,000 centipoise at 25° C., having the general formula:

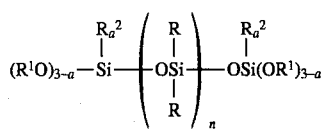

wherein R, $R^1$ and $R^2$ are each methyl radicals; "n" is a whole number ranging from about 50 to about 2500, and "a" is a whole number which is either 0 or 1;

B. from about 0.2 to about 0.5 parts of di(n-butyl)tin-bis(acetylacetonate);

C. from about 0.4 to about 0.8 parts of hexamethyldisilazane;

D. from about 0.8 to about 1.6 parts of gamma-glycidoxypropyltrimethoxysilane; and E. from 0.5 to about 1.6 parts of methyltrimethoxysilane.

24. The cured composition of claim 1.

25. The cured composition of claim 23.

26. A substrate coated with the composition of claim 1.

27. A substrate according to claim 26 wherein the substrate is a masonry substrate, aluminum, glass, polyacrylate, polycarbonate, polyvinylchloride, or concrete substrate.

28. A substrate coated with the composition of claim 23.

29. A substrate according to claim 28 wherein the substrate is a masonry substrate, aluminum, glass, polyacrylate, polycarbonate, polyvinylchloride, or concrete substrate.

30. A substrate coated with the cured composition of claim 1.

31. A substrate according to claim 30 wherein the substrate is a masonry substrate, aluminum, glass, polyacrylate, polycarbonate, polyvinylchloride, or concrete substrate.

32. A substrate coated with the cured composition of claim 23.

33. A substrate according to claim 32 wherein the substrate is a masonry substrate, aluminum, glass, polyacrylate, polycarbonate, polyvinylchloride, or concrete substrate.

* * * * *